United States Patent [19]
Hall et al.

[11] Patent Number: 5,422,559
[45] Date of Patent: Jun. 6, 1995

[54] PULSED BATTERY CHARGER CIRCUIT

[75] Inventors: Jefferson W. Hall, Phoenix; Thomas D. Petty, Tempe; Renwin J. Yee, Chandler; Robert L. Vyne, Tempe; Troy L. Stockstad, Phoenix, all of Ariz.

[73] Assignee: Motorola, Inc., Schaumburg, Ill.

[21] Appl. No.: 161,627

[22] Filed: Dec. 6, 1993

[51] Int. Cl.6 ................... H01M 10/44; H01M 10/46
[52] U.S. Cl. ............................................. 320/21; 320/24
[58] Field of Search ..................... 320/21, 19, 22, 24, 320/27

[56] References Cited

U.S. PATENT DOCUMENTS

| | | | |
|---|---|---|---|
| 3,854,082 | 12/1974 | Nasby et al. | 320/22 |
| 3,864,617 | 2/1975 | Smith et al. | 320/23 |
| 4,433,277 | 2/1984 | Carollo et al. | 320/24 |
| 5,198,743 | 3/1993 | McClure et al. | 320/31 |
| 5,321,347 | 1/1994 | Chien | 320/21 |

Primary Examiner—Steven L. Stephan
Assistant Examiner—Nicholas Ponomarenko
Attorney, Agent, or Firm—Gary W. Hoshizaki

[57] ABSTRACT

A pulsed battery charger circuit (11) for charging a battery (28). A control circuit (17) is responsive to a sense circuit (16) that monitors the battery voltage. The control circuit (17) pulses a first current source (25) or a second current source (20). An amplifier (14) is responsive to the first (25) and second (20) current sources for generating first and second predetermined voltages between a drive output (12) and a sense input (13). The first current source (25) is pulsed when the sense circuit (16) senses the battery voltage to be less than a first threshold voltage. The second current source (20) is pulsed when the sense circuit (16) senses the battery voltage to be greater than the first threshold voltage. Both the first (25) and second (20) current sources are disabled when the sense circuit (16) senses the battery voltage to be greater than a second threshold voltage.

23 Claims, 3 Drawing Sheets

PULSED BATTERY CHARGER CIRCUIT

BACKGROUND OF THE INVENTION

The present invention relates, in general, to battery charger circuits, and more particularly to output stage circuits.

One type of battery charger is a pulsed battery charger. A pulsed battery charger provides charge to a battery on an intermittent or periodic basis. In general, this type of charger incorporates voltage sense circuitry, control circuitry, and drive circuitry. The voltage sense circuitry senses the voltage of the battery. The control circuitry determines how the battery is charged based on the sensed battery voltage. The driver circuitry provides the required current to charge the battery. Periodic or intermittent charging is achieved with a switchable current source.

An application where a pulsed battery charger is needed is in charging rechargeable alkaline batteries. Rechargeable alkaline batteries require precise charging to a predetermined voltage in order to attain maximum use between chargings. Overcharging this type of battery by more than a few millivolts may cause battery damage. The rechargeable alkaline batteries have a high series resistance that produces a voltage drop in series with the battery voltage. Sensing the battery voltage when charging is not easily accomplished. Pulse charging provides an accurate way of sensing battery voltage. The voltage is sensed between pulses when the battery is not being charged thereby providing an accurate measurement of the battery voltage. The average charging current of the battery charger can be controlled by the duty cycle of the pulse charging system.

Most battery chargers are manufactured for simplicity and to reduce costs. Standard battery chargers do not provide the precise control needed to charge a rechargeable alkaline battery without damage or shortening the number of times it can be charged. It would be of great benefit, if a battery charger output stage circuit is provided that could charge a battery to a precise voltage.

DETAILED DESCRIPTION OF THE DRAWINGS

Figure 1:
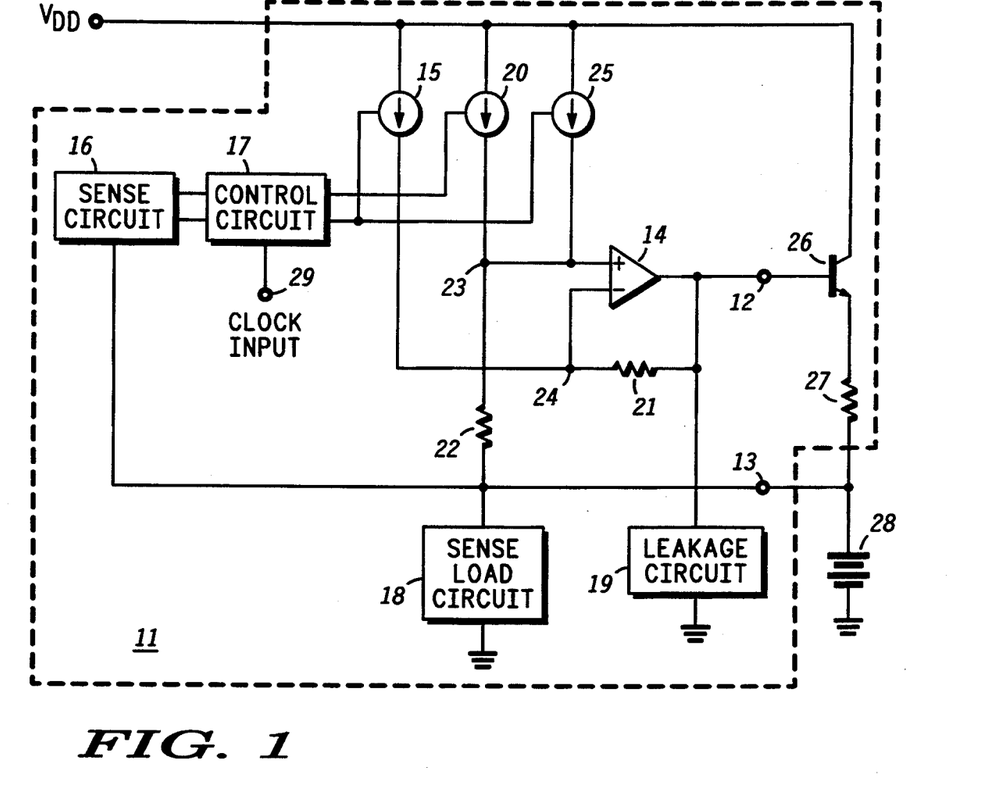
FIG. 1 is a block diagram of a pulsed battery charger circuit in accordance with the present invention.

FIG. 1 is a block diagram of a pulsed battery charger circuit 11. Pulsed battery charger circuit 11 is formed as an integrated circuit and includes, a drive output 12 and a sense input 13. In the preferred embodiment, an external drive circuit is used to increase current drive of pulsed battery charger circuit 11. The external drive circuit comprises a transistor 26 and a resistor 27. Discrete components (transistor 26 and resistor 27) are used to reduce manufacturing costs. An alternative approach would be to integrate transistor 26 and resistor 27 to minimize interconnections and components. A battery 28 is coupled to sense input 13 for charging. Sense input 13 senses the voltage on battery 28 and determines such things as battery 28 voltage polarity (positive or negative voltage), high current or low current charging, and when charging is completed. Pulsed battery charger circuit 11 generates a controlled voltage between drive output 12 and sense input 13 for providing a predetermined current to battery 28. As the voltage of battery 28 nears full charge the average current provided to battery 28 is reduced.

Pulsed battery charger circuit 11 comprises a sense circuit 16, control circuit 17, amplifier 14, current sources 15, 20, and 25, resistors 21 and 22, sense load 18, and leakage circuit 19. Amplifier 14 is an operational amplifier including a positive or non-inverting input coupled to a node 23, a negative or inverting input coupled to a node 24, and an output coupled to drive output 12. Resistor 21 is coupled between drive output 12 and node 24. Resistor 22 is coupled between sense input 13 and node 23.

Sense circuit 16 includes an input coupled to sense input 13, a first output, and a second output. Control circuit 17 includes first and second inputs coupled respectively to the first and second outputs of sense circuit 16, a clock input 29, and first and second outputs. Current source 15 couples to node 24 and includes a control input coupled to the second output of control circuit 17. Current source 20 couples to node 23 and includes a control input coupled to the first output of control circuit 17. Current source 25 couples to node 23 and includes a control input coupled to the second output of control circuit 17.

Leakage circuit 19 couples to drive output 12. Sense load 18 couples to sense input 13. Transistor 26 of the external drive circuit is in a voltage follower configuration. Transistor 26 is an npn transistor having a collector, base, and emitter corresponding respectively to a first electrode, control electrode, and second electrode. Transistor 26 has the base coupled to drive output 12 and the collector coupled to receive a supply voltage. Resistor 26 is coupled between the emitter of transistor 26 and sense input 13.

The sense circuit 16 monitors the voltage on the battery to determine the mode for the charging function. The battery is charged when the battery voltage is below a predetermined level. If the battery voltage is low, but not below a defined undervoltage level, the sense circuit directs the control circuit 17 to charge the battery with a normal charge current. If the battery voltage is below the undervoltage level, the battery is charged at a reduced rate until its voltage reaches the level for the normal charge rate. If the battery voltage is above the predetermined level or if a battery is not present in the charger, the charge current will be prevented for occurring.

Operation of pulsed battery charger circuit 11 is described hereinafter. Sense circuit 16 monitors the voltage on battery 28 to determine the mode of operation of pulsed battery charger circuit 11. In a normal charge mode, the voltage on battery 28 is within a prescribed window. The prescribed window has a lower threshold voltage and an upper threshold voltage. Sense circuit 16 directs control circuit 17 via its first output to charge battery 28 with a normal charge current.

In the preferred embodiment, the voltage of battery 28 is sensed by sense circuit 16 during a non-charging portion of a charge cycle. A first reason for measuring battery voltage during the non-charging cycle is that some battery types have a high internal resistance. A resistance from 0.5 ohms to 3.0 ohms is not uncommon. Sense circuit 16 could generate a false reading of battery 28 charge level if battery voltage is sensed while charging due to the additional voltage drop caused by the internal battery resistance. The electrochemical state of battery 28 is related to the open circuit voltage of the battery 28. Thus a more accurate comparison is generated by sense circuit 16 during the non-charging portion of the charge cycle.

A second reason for comparing the voltage during the non-charging portion of the charge cycle is to detect when no battery is coupled to sense input 13. For this case, sense load 18 pulls sense input 13 to ground. During the charge portion of the charge cycle the voltage at sense input is driven to a voltage substantially larger than ground. The difference in voltage at sense input 13 during the charging cycle is detected and used to determine that a battery is not coupled to sense input 13.

In an undervoltage charge mode, sense circuit 16 detects the voltage of battery 28 is below the lower threshold voltage. Sense circuit 16 directs control circuit 17 via its first and second outputs to charge battery 28 with a charge current having a magnitude less than the normal charge current. Battery 28 is charged at this reduced charge current until the voltage of battery 28 is greater than the lower threshold voltage.

Battery 28 is fully charged when the voltage of battery 28 is greater than the upper threshold voltage. Sense circuit 16 detects when the voltage of battery 28 is greater than the upper threshold voltage and directs control circuit 17 via its first and second outputs to stop charging battery 28.

Control circuit 17 controls switchable current sources 15, 20, and 25 via its first and second outputs. Control circuit 17 also sets the duty cycle for current sources 15, 20, and 25 based upon the magnitude of supply voltage VCC. Each current source 15, 20, and 25 operates at predetermined and constant levels for the duration of their operation within each duty cycle.

Operational amplifier 14 provides a constant voltage between drive output 12 and sense input 13 when pulsing current to battery 28. The magnitude of the constant voltage is determined by current sources 15, 20, and 25. The constant voltage between drive output 12 and sense input 13 will generate a constant current through transistor 26 and resistor 27. The current provided by transistor 26 charges battery 28.

In a normal mode of operation, current source 20 is enabled by control circuit 17 when the voltage (Vbattery) on battery 28 is between the lower and upper threshold voltages. Current sources 15 and 25 are disabled. Operational amplifier 14 is configured as a voltage follower. Current (I20) provided by current source 20 will produce a voltage drop across resistor 22 (R22). The voltage across resistor 21 is approximately zero. Operational amplifier 14 will reproduce at drive output 12 the voltage appearing at its non-inverting input (V+). Thus, the non-inverting and inverting (V−) inputs of operational amplifier 14 and drive output 12 (V12) are at approximately the same voltage. The voltage magnitude at the non-inverting input is described by equation 1. A first predetermined voltage (VF1) generated across drive output 12 and sense input 13 is described by equation 2.

$$V+ = (I20*S22) + Vbattery = V- = V(12) \quad (1)$$

$$VF1 = V(12) - Vbattery = (I20*R22) \quad (2)$$

Transistor 26 is in a voltage follower configuration. The voltage at the emitter of transistor 26 is approximately the voltage a drive output 12 minus a base-emitter voltage drop (Vbe). A first predetermined current (Iout1) provided to battery 28 is determined by the voltage drop across resistor 27 (R27) and the magnitude of resistor 27. The first predetermined current is described by equation 3.

$$Iout1 = ((I20*R22) - Vbe)/R27 \quad (3)$$

Current sources 15, 20, and 25 are enabled by control circuit 17 when the voltage on battery 28 is below the lower threshold voltage (under voltage condition). Battery 28 is charged with a second predetermined current (Iout2) which is less than the first predetermined current. A reduced voltage across drive output 12 and sense input 13 is required to generate the second predetermined current. Reducing the voltage at drive output 12 can lower the voltages at the non-inverting and inverting inputs of operational amplifier 14 below the lower limit of the common mode input range. This problem is eliminated by level shifting the inputs of operational amplifier 14 via source 15 and resistor 21. Current sources 20 and 25 provide currents (I20 and I25 respectively) to generate a voltage drop across resistor 22 (R22). Current source 15 provides a current (I15) to generate a voltage drop across resistor 21 (R21). In this situation, the voltages at the non-inverting and inverting inputs are equal. This is described by equation 4. A second predetermined voltage (VF2) generated across drive output 12 and sense input 13 is described by equation 5. The second predetermined current (Iout2) which charges battery 28 is described by equation 6.

$$V+ = V- = ((I20+I25) * R22) + Vbattery \quad (4)$$

$$VF2 = ((I20+I25) * R22) - (I15 * R21) \quad (b\ 5)$$

$$Iout2 = (((I20+I25) * R22) - (I15 * R21) - Vbe(transistor\ 26))/R27 \quad (6)$$

Note that the voltage at the non-inverting and inverting inputs of operational amplifier 14 are at an increased voltage even though battery 28 is charged with a current of reduced magnitude from normal operation.

Current sources 15, 20 and 25 are turned off when the voltage of battery 28 exceeds the upper threshold voltage. In this condition, there is no voltage drop across resistor 22 to develop a voltage across drive output 12 and sense input 13, thus, transistor 26 is turned off and battery 28 is not being charged.

Sense load 18 is designed to be an active pull-down on sense input 13. The voltage at sense input 13 is not well defined when the battery is removed from pulsed battery charger circuit 11 without sense load 18. Sense load 18 forces sense input 13 to a defined voltage condition which is detected by and acted upon by the sense circuit 16. When battery 28 is present, the loading current due to sense load 18 is insignificant relative to the first or second predetermined currents (for charging). Sense load 18 does not continue to draw current from battery 28 (draining the battery) if power is removed from pulsed battery charger circuit 11. This allows batteries to be stored in an unplugged charger without degrading battery shelf life.

The current sink circuit 19 is low level active current source load which sinks operational amplifier 14 output leakage current away from the power transistor 26 to ensure that it remains off when operational amplifier 14 is turned off.

Figure 2:
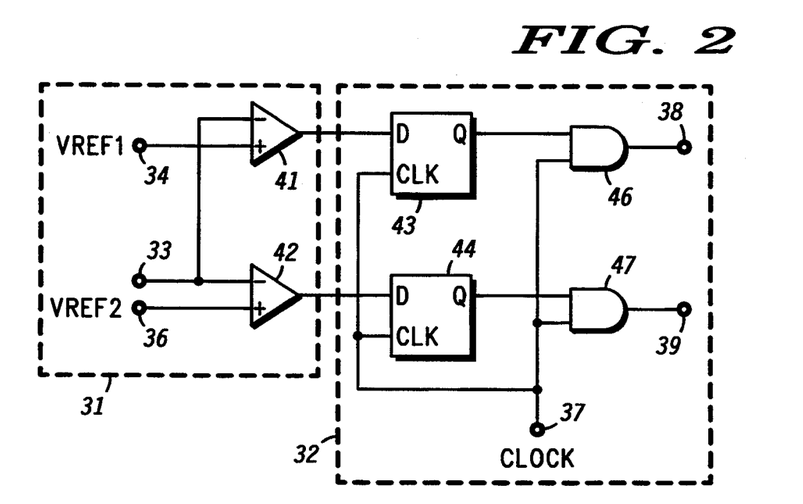
FIG. 2 is a block diagram of a sense circuit and a control circuit in accordance with the present invention.

FIG. 2 is a block diagram of a sense circuit 31 and a control circuit 32 in accordance with the present invention. Sense circuit 31 and control circuit 32 correspond respectively to sense circuit 16 and control circuit 17 of FIG. 1. Sense circuit 31 comprises comparators 41 and 42. Control circuit 32 comprises flip flops 43 and 44 and AND gates 46 and 47.

Comparator 41 includes a negative or inverting input coupled to an input 33, a positive or non-inverting input coupled to input 34 for receiving a reference voltage VREF1, and an output. Comparator 42 includes an inverting input coupled to input 33, a non-inverting input coupled to input 36 for receiving a reference voltage VREF2, and an output. Input 33 is a sense input that corresponds to the input of sense circuit 16 of FIG. 1 for sensing battery voltage.

Flip flop 43 includes a D-input coupled to the output of comparator 41, a clock input coupled to a clock input 37, and a Q-output. Flip flop 44 includes a D-input coupled to the output of comparator 42, a clock input coupled to clock input 37, and a Q-output. AND gate 46 includes a first input coupled to the Q-output of flip flop 43, a second input coupled to clock input 37, and an output coupled to an output 38. AND gate 47 includes a first input coupled to the Q-output of flip flop 44, a second input coupled to clock input 37, and an output coupled to output 39.

Operation of sense circuit 31 and control circuit 32 is described hereinafter. Sense circuit 31 of FIG. 2 compares a voltage applied to input 33 to the reference voltages VREF1 and VREF2 (inputs 34 and 36 respectively). The applied voltage to input 33 is a battery voltage similar to that applied to the input of sense circuit 16 of FIG. 1. In the preferred embodiment, VREF1 has a voltage magnitude greater than VREF2.

Comparator 41 compares VREF1 to the voltage applied to input 33 and provides an output signal to flip flop 43 of control circuit 32. Similarly, comparator 42 compares VREF2 to input 33 and provides an output signal to flip flop 44.

Flip flops 43 and 44 are clocked by a clock signal applied to input 37 and store the results provided by sense circuit 31. The Q outputs of flip flops 43 and 44 are coupled respectively to clocked AND gates 46 and 47. AND gates 46 and 47 provide the logic levels at the Q-output of flip flops 43 and 44 during a high phase of the clock signal.

In the preferred embodiment, sense circuit 31 and control circuit 32 correspond respectively to sense circuit 16 and control circuit 17 of FIG. 1. VREF1 corresponds to the upper threshold voltage and VREF2 corresponds to the lower threshold voltage in the description of FIG. 1.

When the voltage applied to input 33 is less than VREF2 both comparators 41 and 42 provide high or one logic levels to control circuit 32. This corresponds to the undervoltage charge mode in the description of FIG. 1. The one logic levels are stored in flip flops 43 and 44 and shifted out to their respective Q-outputs. AND gates 46 and 47 provide one logic levels at outputs 38 and 39 during a high phase of the clock signal. This corresponds to the condition where current sources 15, 20, and 25 are enabled by control circuit 17 as described in the description FIG. 1. During a low phase of the clock signal both AND gates 46 and 47 provide zero logic levels at outputs 38 and 39. This corresponds to a condition where a battery is not being charged.

When the voltage applied to input 33 is greater than VREF2 but less than VREF1, comparator 41 provides a one logic level and comparator 42 provides a zero logic level. This corresponds to the normal charge mode in the description of FIG. 1. The one and zero logic levels are stored respectively in flip flops 43 and 44 and shifted out to their respective Q-outputs. AND gates 46 and 47 respectively provide a one logic level and a zero logic level at outputs 38 and 39 during a high phase of the clock signal. This corresponds to the condition where current source 20 is enabled by control circuit 17 as described in the description of FIG. 1. During a low phase of the clock signal both AND gates 46 and 47 provide zero logic levels at outputs 38 and 39.

When the voltage applied to input 33 is greater than VREF1 and VREF2, comparators 41 and 42 both output zero logic states. The zero logic states stored in flip flops 43 and 44 are shifted out to their respective Q-outputs. AND gates 46 and 47 will provide zero logic levels at outputs 38 and 39 during the high and low phase of the clock signal. This corresponds to either a fully charged battery or a no battery condition where current sources 15, 20, and 25 are turned off (no charging) as described in the description of FIG. 1.

Figure 3:
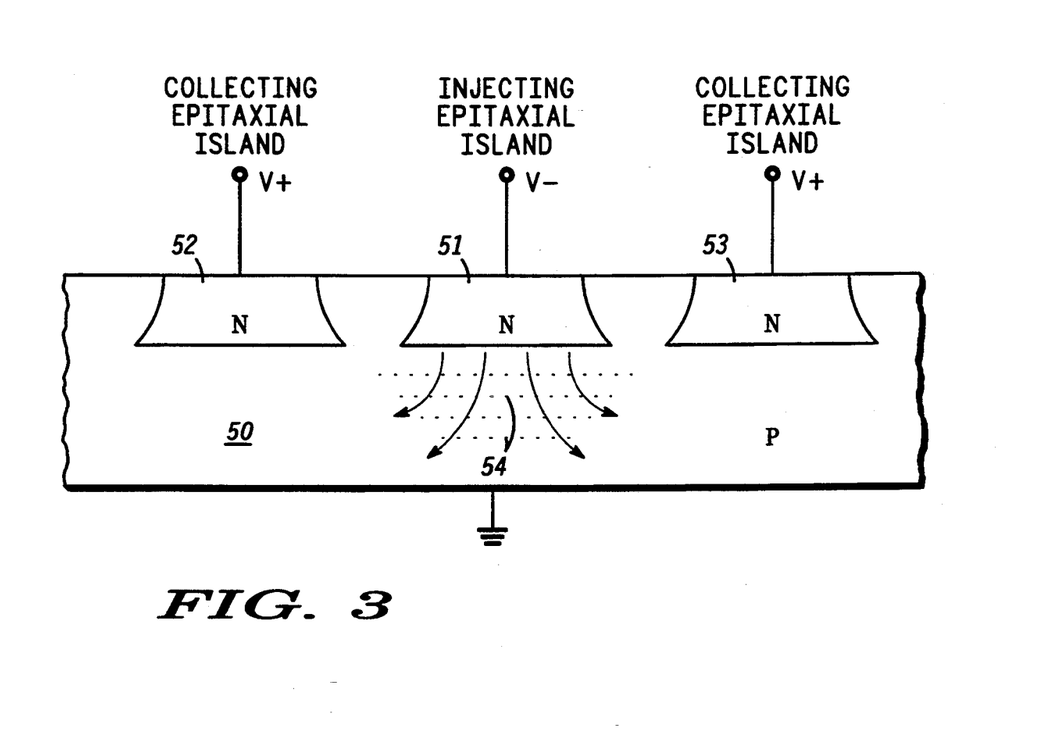
FIG. 3 is a cross section of epitaxial islands demonstrating substrate injection that could affect performance of the pulsed battery charger circuit.

FIG. 3 is a cross section of epitaxial islands 51–53 demonstrating substrate injection. N-type epitaxial islands 51–53 are formed in a p-type substrate 50. Substrate 50 is typically coupled to the lowest circuit potential, in this case substrate 50 is coupled to ground. Substrate injection occurs when an epitaxial island becomes forward biased to the integrated circuit substrate in which it is formed.

In the preferred embodiment, pulsed battery charger circuit 11 (FIG. 1) has a p-type substrate and n-type epitaxial islands. An n-type epitaxial island corresponds to a collector of an npn transistor. A negative voltage applied to an epitaxial island will forward bias the epitaxial island in relation to the substrate. This situation can occur when a battery is coupled in an opposite (or reverse) fashion from normal battery coupling.

Substrate injection from epitaxial island 51 to collecting epitaxial islands 52 and 53 is illustrated in FIG. 3. A negative voltage applied to epitaxial island 51 forward biases the pn junction comprising substrate 50 and epitaxial island 51. This creates the condition referred to as "substrate injection". Initial observation of substrate injection would show the pn junction being forward biased limiting the negative excursion of epitaxial island 51 to no more than a diode drop below the potential (ground) of substrate 50. However, further examination shows that the forward biasing of the pn junction will activate a parasitic lateral npn transistor. Electrons 54 (shown as dots) are injected from epitaxial island 51 into substrate 50 (indicated by arrows) similar to an emitter injecting electrons into a base. Electrons 54 that do not recombine in the substrate are collected by neighboring epitaxial islands 52 and 53. Epitaxial islands 52 and 53 correspond to collectors of the parasitic lateral npn transistor. If the collecting epitaxial islands (52 and 53)

are connected to the power supply through low resistance paths, high current flow or latchup may occur. The circuitry of pulsed battery charger circuit 11 (FIG. 1) is designed to eliminate any negative potentials that could couple to epitaxial islands with special care taken for the output stage which is described hereinafter in FIG. 5.

Figure 4:
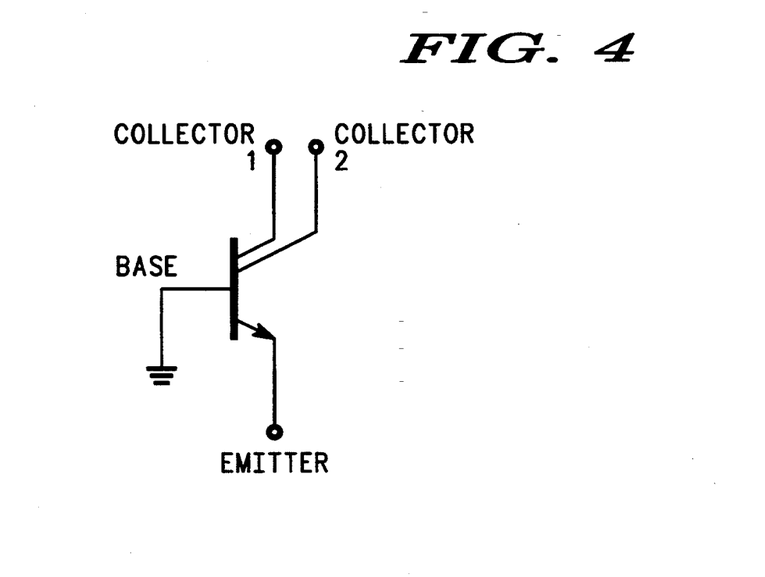
FIG. 4 is a symbolic representation of a parasitic lateral npn transistor as shown in FIG. 3.

FIG. 4 is a symbolic representation of a parasitic lateral npn transistor 54 having collectors 1 and 2, a base, and an emitter. Collectors 1 and 2 correspond respectively to epitaxial islands 52 and 53 of FIG. 3. The base corresponds to substrate 50 of FIG. 3. The emitter corresponds to epitaxial island 51 of FIG. 3.

Figure 5:
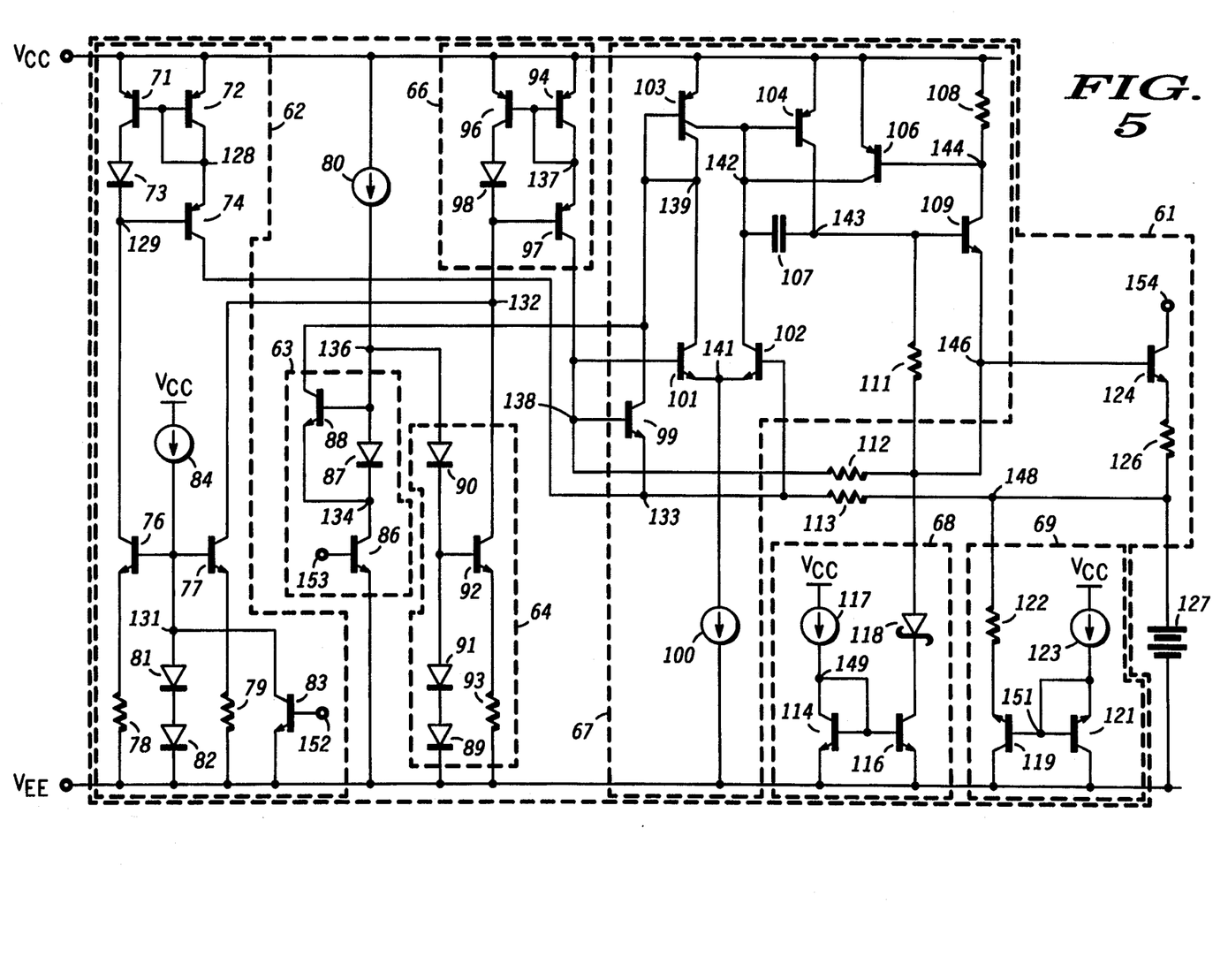
FIG. 5 is a schematic diagram of a battery charger output stage circuit in accordance with the present invention.

FIG. 5 is a schematic of a battery charger output stage circuit 61 in accordance with the present invention. Battery charger output stage circuit 61 comprises a level shift current source circuit 62, an on/off control circuit 63, a current generator circuit 64, a current mirror circuit 66, an operational amplifier 67, a leakage circuit 68, a sense load 69, a power transistor 124, and a resistor 126. All pnp transistors and npn transistors of battery charger output stage circuit 61 have a collector, base, and emitter, corresponding respectively to a first electrode, control electrode, and second electrode.

Level shift current source circuit 62 comprises pnp transistors 71, 72, and 74, diodes 73, 81, and 82, npn transistors, 76, 77, and 83, resistors 78 and 79, and current source 84. Pnp transistor 71 includes an emitter coupled for receiving a supply voltage VCC, a base coupled to a node 128, and a collector. Diode 73 includes a first terminal coupled to the collector of pnp transistor 71 and a second terminal coupled to a node 129. Pnp transistor 72 includes an emitter coupled for receiving the supply voltage VCC, and a base and emitter coupled to node 128. Pnp transistor 74 includes an emitter coupled to node 128, a base coupled to node 129, and a collector coupled to a node 138. Npn transistor 76 includes an emitter, a base coupled to a node 131, and a collector coupled to node 129. A resistor 78 includes a first terminal coupled to the emitter of npn transistor 76 and a second terminal coupled for receiving a supply voltage VEE. Npn transistor 77 includes an emitter, a base coupled to node 131, and a collector coupled to a node 132. Resistor 79 includes a first terminal coupled to the emitter of npn transistor 77 and a second terminal coupled for receiving the supply voltage VEE. Current source 84 is coupled to node 131 for providing a current thereat. Diodes 81 and 82 are coupled in series. Diode 81 includes a first terminal coupled to node 131 and a second terminal. Diode 82 includes a first terminal coupled to the second terminal of diode 81 and a second terminal coupled for receiving the supply voltage VEE. Transistor 83 includes an emitter coupled for receiving the supply voltage VEE, a base coupled to an input 152, and a collector coupled to node 131.

On/off control circuit 63 comprises npn transistors 86 and 88, and diode 63. Npn transistor 86 includes an emitter coupled for receiving the supply voltage VEE, a base coupled to an input 153, and a collector coupled to a node 134. Diode 63 includes a first terminal coupled to a node 136 and a second terminal coupled to node 134. Npn transistor 88 includes an emitter coupled to node 134, a base coupled to node 136, and a collector coupled to a node 139.

Current generator circuit 64 comprises a npn transistor 92, diodes 89, 90, and 91, and resistor 93. Npn transistor 92 includes an emitter, a base coupled to node 136, and a collector coupled to node 132. Diodes 89–91 are coupled in series. Diode 90 includes a first terminal coupled to node 136 and a second terminal. Diode 91 includes a first terminal coupled to the second terminal of diode 90 and a second terminal. Diode 89 includes a first terminal coupled to the second terminal of diode 91 and a second terminal coupled for receiving the supply voltage VEE. Resistor 93 includes a first terminal coupled to the emitter of npn transistor 92 and a second terminal coupled for receiving the supply voltage VEE.

A current source 80 biases on/off control circuit 63 and current generator circuit 64. Current source 80 is coupled to node 136 for providing a current thereat.

Current mirror circuit 66 includes pnp transistors 94, 96, and 97, and diode 98. Pnp transistor 94 includes an emitter coupled for receiving the supply voltage VCC, and a base and collector coupled to a node 137. Pnp transistor 96 includes an emitter coupled for receiving the supply voltage VCC, a base coupled to node 137, and a collector. Pnp transistor 97 includes an emitter coupled to node 137, a base coupled to node 132, and a collector coupled to a node 133. Diode 98 includes a first terminal coupled to the collector of pnp transistor 96 and a second terminal coupled to node 132.

Operational amplifier 67 comprises pnp transistors 103, 104, and 106, npn transistors 99, 101, 102, and 109, resistors 108 and 111, a current source 100, and a capacitor 107. Npn transistor 99 includes an emitter coupled to node 133, a base coupled to node 138, and a collector coupled to a node 139. Npn transistors 101 and 102 form an input differential pair. Npn transistor 101 includes an emitter coupled to a node 141, a base coupled to a node 138, and a collector coupled to a node 139. Npn transistor 102 includes an emitter coupled to node 141, a base coupled to node 133, and a collector coupled to a node 142. Current source 100 couples to node 141 for biasing the input differential pair. Pnp transistor 103 is a split collector transistor. Pnp transistor 103 includes an emitter coupled for receiving the supply voltage VCC, a base coupled to node 139, a first collector coupled to node 139, and a second collector coupled to node 142. Pnp transistor 104 includes an emitter coupled for receiving the supply voltage VCC, a base coupled to node 142, and a collector coupled to a node 143. Capacitor 107 is a compensation capacitor for operational amplifier 67. Capacitor 107 includes a first terminal coupled to node 142 and a second terminal coupled to node 143. In the preferred embodiment, capacitor 107 has a metal top plate and an epitaxial island as a bottom plate. For this configuration the metal top plate should be coupled to node 143 to prevent substrate injection as described in FIG. 3. Pnp transistor 106 includes an emitter coupled for receiving the supply voltage VCC, a base coupled to a node 144, and a collector coupled to node 142. Resistor 108 couples includes a first terminal coupled for receiving the supply voltage VCC and a second terminal coupled to node 144. Npn transistor 109 includes an emitter coupled to a node 146, a base coupled to node 143, and a collector coupled to node 144. Resistor 111 includes a first terminal coupled to node 143 and a second terminal coupled to node 146.

Resistor 112 includes a first terminal coupled to node 138 and a second terminal coupled to node 146. Resistor 113 includes a first terminal coupled to node 133 and a second terminal coupled to a node 148.

Leakage circuit 68 comprises a current source 117, npn transistors 114 and 116, and Schottky diode 118. Current source 117 is coupled to a node 149. Npn transistor 114 includes an emitter coupled for receiving the supply voltage VEE, and a base and collector coupled to node 149. Npn transistor 116 includes an emitter coupled for receiving the supply voltage VEE, a base coupled to node 149, and a collector. Schottky diode 118 includes a first terminal coupled to node 146 and a second terminal coupled to the collector of npn transistor 116.

Sense load 69 comprises a resistor 122, npn transistors 119 and 121, and a current source 123. Resistor 122 includes a first terminal coupled to node 148 and a second terminal. Npn transistors 119 and 121 are configured in a reverse mode of operation. Npn transistor 119 includes and emitter coupled to the second terminal of resistor 122, a base coupled to a node 151, and a collector coupled for receiving the power supply VEE. Npn transistor 121 includes an emitter and base coupled to node 151, and a collector coupled for receiving the supply voltage VEE. Current source 123 is coupled to node 151.

Power transistor 124 includes a collector coupled to a terminal 154 for receiving a voltage, a base coupled to node 146, and an emitter. Resistor 126 includes a first terminal coupled to the emitter of power transistor 124 and a second terminal coupled to node 148. A battery 127 couples to node 148 for charging.

Operation of battery charger output stage 61 is described hereinafter. Operation of battery charger output stage 61 centers around operational amplifier 67.

A first gain stage is made up of matched differential npn transistor pair 101 and 102 that are biased by current source 100. Npn transistors 101 and 102 drive a current mirror circuit comprising split-collector pnp transistor 103 that completes the first gain stage. An output of the first gain stage corresponds to node 142.

An output stage comprising pnp transistor 104 and npn transistor 109 is coupled to node 142. The output stage is current limited by resistor 108 and transistor 106 which is well known in the art. An output of the output stage corresponds to node 146.

Npn transistor 99 acts as voltage limiting device across the differential input npn transistors 101 and 102. Without transistor 99, npn transistors 101 and 102 could be damaged via zener breakdown due to a high voltage applied to node 148 by battery 127. Resistor 111 prevents potential leakage current from pnp transistor 104 from turning on npn transistor 109 when it is intended to be off.

Operational amplifier 67 is frequency stabilized by capacitor 107. The output of operational amplifier 67 is at node 146. Negative feedback is provided by resistor 112 which couples node 146 to node 138.

Normal operation of battery charger output stage 61 occurs when a first input signal applied to input 152 enables npn transistor 83 and a second input signal applied to input 153 disables npn transistor 86. The voltage of battery 127 is between an upper and lower threshold voltage in this normal charging operation which determines the state of the first and second input signals. Battery charger output stage 61 provides a pulsed current of a first predetermined magnitude to battery 127.

Npn transistor 83 is enabled for receiving current from current source 84 thereby disabling npn transistors 76 and 77. No current is provided by level shift current source circuit 62 under this condition.

Npn transistor 86 of on/off control circuit 63 is disabled by the second input signal allowing the current of current source 80 to flow into current generator circuit 64. Current generator circuit 64 generates a predetermined current based on standard techniques of imposing the Vbe (base-emitter) voltage of a transistor or diode across a resistor. The predetermined current, generated through resistor 93 is transferred to current mirror circuit 66 by transistor 92. Current mirror circuit 66 provides its output current to resistor 113 which sets the reference voltage that is presented to the non-inverting input of operational amplifier 67. Since level shift current source circuit 62 is disabled no current is provided by transistor 74. Assuming the input bias current of operational amplifier 67 is negligible, the voltage across resistor 112 is approximately zero which allows operational amplifier 67 to operate as a simple voltage follower. Therefore, the voltage that appears on the non-inverting input (node 133) will appear at the output of operational amplifier 67 (node 145). Operational amplifier 67 transfers the voltage generated by the current through resistor 113 to transistor 124 and resistor 126. The portion of this voltage that drops across resistor 126 sets the current which will charge the battery 127.

An undervoltage charging operation occurs when the voltage of battery 127 is below the lower threshold voltage. In this case, the input signal applied to input 152 disables transistor 83 and the input signal applied to input 153 disables transistor 86 (as in normal charging operation). Battery charger output stage 61 provides a pulsed current of a second predetermined magnitude to battery 127.

Transistor 83 is disabled allowing current source 84 to bias diodes 81 and 82 thereby activating a first current source comprising npn transistor 76 and a second current source comprising npn transistor 77 and resistor 79. The current developed in transistor 76 of current level shift current source circuit 62 is mirrored from the positive rail (VCC) via the Wilson current mirror comprising pnp transistors 71, 72, and 74, and diode 73. This is similar to the structure of current mirror 66. The collector of pnp transistor 74, is coupled to node 138 and drives resistor 112 to create a level shift in a voltage from the output (node 145) of operational amplifier 67, to the inverting input (node 138).

The current of npn transistor 77 (level shift current source circuit 62) is summed with the current of transistor 92 (current generator circuit 64) to increase the mirrored current provided by current mirror circuit 66. This increases the voltage drop across resistor 113 and level shifts the non-inverting input (133) of operational amplifier 67. The voltage at the output (node 145) of operational amplifier 67 with respect to battery 127 is the voltage across resistor 113 minus the voltage across resistor 112. In the preferred embodiment, this difference voltage across resistors 112 and 113 is smaller than in the case for normal charging current. The reduced charging current in the undervoltage charging operation is chosen to accommodate the requirement for charging a low voltage battery.

The level shifting on resistors 112 and 113 is necessary during low battery charging to keep the inputs of operational amplifier 67 within its common mode operating range. Without level shifting the inputs (nodes 133 and 138) would receive voltages that would disable transistors 101 and 102.

Two cases exist for terminating drive to battery 127. In the first case, drive is terminated to create an off portion of a charging cycle. Open circuit battery voltage is monitored at this time. In the second case, drive is terminated when battery 127 is fully charged. Overcharging battery 127 can produce damage or shorten operating life. Terminating drive is accomplished by applying signals to inputs 152 and 153 that enables npn transistors 83 and 86. In this case, level shift current source circuit 62, current generator 64, and current mirror circuit 66 are disabled. The output voltage of operational amplifier 67 is approximately equal to voltage of battery 127 which produces zero volts across the base-emitter junction transistor 124 terminating charging current to battery 127.

To insure operational amplifier 67 is off, diode 87 mirrors its current in transistor 88 which forces the collector of 103 to drive transistor 104 off. Thus, no current is provided to the base transistor 109 insuring that no current is provided to transistor 124.

Additional circuitry is added as a precaution to prevent unintentional drive to transistor 124. Leakage circuit 68 receives leakage current that may develop at node 146. Current source 117 is mirrored via npn transistors 114 and 116 to sink leakage current through Schottky diode 118. Schottky diode 118 is needed to buffer the collector of npn transistor 116 from negative voltages that could be applied to node 146. For example, a reverse insertion of battery 127 would apply a negative voltage to node 146. Pulling an npn transistor collector below substrate potential on a standard bipolar process can cause adverse circuit operation or damage by activating parasitic lateral NPN transistors.

Sense load circuit 69 is an active pull-down on node 148. Current source 123 is mirrored in the inverse active current mirror created by npn transistor 121 and 119. The inverse active mirror is used to avoid pulling epitaxial islands below substrate potential thereby activating a parasitic device. Without sense load circuit 69, the voltage on node 148 would not be well defined when battery 127 is removed. An additional benefit of sense load circuit 69 is its ability to charge a negative voltage battery. A negative voltage at node 148 allows transistor 119 to convert to a normal active mode transistor where the emitter functions as illustrated and is current limited by resistor 122. If battery 127 is not present, sense load circuit 69 will force node 148 into a low voltage condition which will be detected by and acted upon by circuitry not illustrated in FIG. 5. When battery 127 is present, the current drawn by sense load circuit 69 is insignificant relative to the charging current provided by transistor 124. If power is removed from battery charger output stage 61, current source 123 will power down terminating current loading of node 148. Thus, battery 127 will not be discharged by any circuitry of battery charger output stage 61 when no power is applied. This maintains a long shelf life for battery 127 even if it remain coupled to node 148.

By now it should be appreciated that a battery charger circuit has been provided that precisely controls battery charging to maximize reuse and power of a battery.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A pulsed battery charger circuit including a drive output and a sense input comprising:

an operational amplifier including a first input, a second input, and an output coupled to the drive output of the pulsed battery charger circuit, said second input being coupled to said output of said operational amplifier;

a sense circuit for sensing a battery voltage applied to the sense input of the pulsed battery charger circuit including an input coupled to the sense input, a first output, and a second output;

a control circuit including first and second inputs coupled respectively to said first and second outputs of said sense circuit, a clock input for receiving a clock signal, a first output, and a second output;

a first current source having a control input coupled to said first output of said control circuit and an output coupled to said first input of said operational amplifier wherein said control circuit enables and disables said first current source for providing first current pulses;

a second current source including a control input coupled to said second output of said control circuit and an output coupled to said first input of said operational amplifier wherein said control circuit enables and disables said second current source for providing second current pulses; and a first resistor including a first terminal coupled to said first input of said operational amplifier and a second terminal coupled to the sense input of the pulsed battery charger circuit.

2. A pulsed battery charger circuit as recited in claim 1 further including:

a transistor including a first electrode coupled for receiving a first supply voltage, a control electrode coupled to the drive output of the pulsed battery charger circuit, and a second electrode; and a resistor including a first terminal coupled to the emitter of said transistor and a second terminal coupled to the sense input of the pulsed battery charger circuit.

3. A pulsed battery charger circuit as recited in claim 2 further including a battery coupled to the sense input of the pulsed battery charger circuit, said battery being charged up by the pulsed battery charger circuit.

4. A pulsed battery charger circuit as recited in claim 3 wherein the pulsed battery charger circuit provides a predetermined voltage across the drive output and sense input for generating a constant current for charging said battery.

5. A pulsed battery charger circuit as recited in claim 3 further including a sense load for loading the sense input when said battery is removed.

6. A pulsed battery charger circuit as recited in claim 1 further including a leakage circuit coupled to the drive output of the pulsed battery charger circuit for receiving leakage currents.

7. A pulsed battery charger circuit as recited in claim 1 wherein said sense circuit comprises:

a first comparator including a first input coupled to said input of said sense circuit, a second input for receiving a first reference voltage, and an output coupled to the first output of said sense circuit; and a second comparator including a first input coupled to said input of said sense circuit, a second input for receiving a second reference voltage, and an output coupled to the second output of said sense circuit.

8. A pulsed battery charger circuit as recited in claim 1 wherein said control circuit comprises:

a first flip flop including an input and a clock input coupled respectively to said first input and said clock input of said control circuit, and a Q-output;

a first AND gate including a first input coupled to said Q-output of said first flip flop, a second input and an output coupled respectively to said clock input and said first output of said control circuit;

a second flip flop including an input and a clock input coupled respectively to said second input and said clock input of said control circuit, and a Q-output; and a second AND gate including a first input coupled to said Q-output of said second flip flop, a second input and an output coupled respectively to said clock input and said second output of said control circuit.

9. A pulsed battery charger circuit as recited in claim 1 wherein said first current source being enabled and disabled by said control circuit for providing said first current pulses to said operational amplifier when a voltage applied to the sense input is greater than a first predetermined voltage.

10. A pulsed battery charger circuit as recited in claim 9 wherein said second current source being enabled and disabled by said control circuit for providing said second current pulses when said voltage applied to the sense input is less than said first predetermined voltage.

11. A pulsed battery charger circuit as recited in claim 10 wherein said first and second current sources being disabled when said voltage applied to the sense input is greater than a second predetermined voltage.

12. A pulsed battery charger circuit as recited in claim 11 further including a third current source having a control input coupled to said second output of said control circuit and an output coupled to said second input of said operational amplifier.

13. An integrated battery charger output stage circuit comprising:
an amplifier including a first input, a second input, and an output;
a level shift current source circuit for providing first and second currents including a control input, a first terminal coupled to said second input of said amplifier, and a second terminal;
a current generator circuit including a terminal coupled to said second terminal of said level shift current source;
a current mirror circuit including a first terminal coupled to said second terminal of said level shift current source circuit and a second terminal coupled to said first input of said amplifier; and
a first resistor including a first terminal coupled to said first input of said amplifier and a second terminal coupled to said output of said amplifier.

14. An integrated battery charger output stage circuit as recited in claim 13 further including:
a power transistor of a first conductivity type including a first electrode coupled for receiving a first supply voltage, a control electrode coupled to said output of said amplifier, and a second electrode; and
a second resistor including a first terminal coupled to said second electrode of said power transistor and a second terminal for coupling to a battery.

15. An integrated battery charger output stage circuit as recited in claim 14 further including:

a third resistor including a first terminal coupled to said second input of said amplifier and a second terminal coupled to said second terminal of said second resistor.

16. A battery charger output stage circuit as recited in claim 13 wherein said amplifier comprises:
a first transistor of a first conductivity type including a first electrode, a control electrode coupled to said first input of said amplifier, and a second electrode coupled to said second input of said amplifier;
a second transistor of said first conductivity type including a first electrode coupled to said first electrode of said first transistor, a control electrode coupled to said first input of said amplifier, and a second electrode;
a third transistor of said first conductivity type including a first electrode, a control electrode coupled to said second input of said amplifier, and a second electrode coupled to said second electrode of said second transistor;
a current source including a terminal coupled to said second electrode of said second transistor;
a split collector transistor of a second conductivity type including a first electrode and a control electrode coupled to said first electrode of said second transistor, a second electrode coupled for receiving a first supply voltage, and a third electrode coupled to said first electrode of said third transistor;
a fourth transistor of said second conductivity type including a first electrode, a control electrode coupled to said first electrode of said third transistor, and a second electrode coupled for receiving said first supply voltage;
a capacitor including a first terminal coupled to said first electrode of said third transistor and a second terminal coupled to said first electrode of said fourth transistor;
a first resistor including a first terminal for receiving said first supply voltage and second terminal;
a fifth transistor of said second conductivity type including a first electrode coupled to said first electrode of said third transistor, a control electrode coupled to said second terminal of said first resistor, and a second electrode coupled for receiving said first supply voltage;
a sixth transistor of said first conductivity type including a first electrode coupled to said second terminal of said first resistor, a control electrode coupled to said second terminal of said capacitor, and a second electrode coupled to said output of said amplifier; and
a second resistor including a first terminal coupled said control electrode of said sixth transistor and a second terminal coupled to said output of said amplifier.

17. An integrated battery charger output stage circuit as recited in claim 16 further including an on/off control circuit having a control input and a first terminal coupled for receiving a bias current, and a second terminal coupled to said control electrode of said split collector transistor, said on/off control circuit comprising:
a first transistor of said first conductivity type including a first electrode, a control electrode coupled to said control input of said on/off control circuit, and a second electrode coupled for receiving a second supply voltage;
a diode including a first terminal coupled to said first terminal of said on/off circuit and a second terminal coupled to said first electrode of said first transistor; and a second transistor of said first conductivity type including a first electrode coupled to said second terminal of said on/off control circuit, a control electrode coupled to said first terminal of said on/off circuit, and a second electrode coupled to said first electrode of said first transistor.

18. An integrated battery charger output stage circuit as recited in claim 13 wherein said level shift current source circuit comprises:

a current source including a terminal;

a first transistor of a first conductivity type including a first electrode, a control electrode coupled to said terminal of said current source, and a second electrode;

a first resistor including a first terminal coupled to said second electrode of said first transistor and a second terminal coupled for receiving a first supply voltage;

a second transistor of said first conductivity type including a first electrode coupled to said second terminal of said level shift current source circuit, a control electrode coupled to said terminal of said current source, and a second electrode;

a second resistor including a first terminal coupled to said second electrode of said second transistor and a second terminal coupled for receiving said first supply voltage;

a first diode including a first terminal coupled to said terminal of said current source and a second terminal;

a second diode including a first terminal coupled to said second terminal of said first diode and a second terminal coupled for receiving said first supply voltage;

a third transistor of said first conductivity type including a first electrode coupled to said terminal of said current source, a control electrode coupled to said control input of said level shift current source circuit, and a second electrode coupled for receiving said first supply voltage;

a fourth transistor of a second conductivity type including a first electrode, a control electrode, and a second electrode coupled for receiving a second supply voltage;

a third diode including a first terminal coupled to said first electrode of said fourth transistor and a second terminal coupled to said first electrode of said first transistor;

a fifth transistor of said second conductivity type including a first electrode and a control electrode coupled to said control electrode of said fourth transistor, and a second electrode coupled for receiving said second supply voltage; and a sixth transistor of said second conductivity type including a first electrode coupled to said first terminal of said level shift current source circuit, a control electrode coupled to said first electrode of said first transistor, and a second electrode coupled to said first electrode of said fifth transistor.

19. An integrated battery charger output stage circuit as recited in claim 13 wherein said current generator circuit comprises:

a first diode including a first terminal for receiving a bias current and a second terminal;

a second diode including a first terminal coupled to said second terminal of said first diode and a second terminal;

a third diode including a first terminal coupled to said second terminal of said second diode and a second terminal coupled for receiving a supply voltage;

a transistor including a first electrode coupled to said terminal of said current generator circuit, a control electrode coupled to said second terminal of said first diode, and a second electrode; and a resistor including a first terminal coupled to said second electrode of said transistor and a second terminal coupled for receiving said supply voltage.

20. An integrated battery charger output stage circuit as recited in claim 13 wherein said current mirror circuit comprises:

a first transistor including a first electrode, a control electrode, and a second electrode coupled for receiving a supply voltage;

a diode including a first terminal coupled to said first electrode of said first transistor and a second terminal coupled to said first terminal of said current mirror circuit;

a second transistor including a first electrode and a control electrode coupled to said control electrode of said first transistor, and a second electrode coupled for receiving said supply voltage; and a third transistor including a first electrode coupled to said second terminal of said current mirror circuit and a control electrode coupled to said first terminal of said current mirror circuit, and a second electrode coupled to said control electrode of said first transistor.

21. An integrated battery charger output stage circuit as recited in claim 14 further including a leakage circuit having a terminal coupled to said output of said amplifier, said leakage circuit comprising:

a current source including a terminal;

a first transistor of said first conductivity type including a first electrode and control electrode coupled to said terminal of said current source, and a second electrode coupled for receiving a second supply voltage;

a second transistor of said first conductivity type including a first electrode, a control electrode coupled to said terminal of said current source, and a second electrode coupled for receiving said second supply voltage; and a Schottky diode including a first terminal coupled to said terminal of said leakage circuit and a second terminal coupled to said first electrode of said second transistor.

22. An integrated battery charger output stage circuit as recited in claim 14 further including a sense load circuit including a terminal coupled to said second terminal of said second resistor, said sense load circuit comprising:

a current source including a terminal;

a first transistor of a second conductivity type including a first electrode coupled for receiving a second supply voltage, and a control electrode and a second electrode coupled to said terminal of said current source, wherein said first transistor is operated in a reverse mode;

a second transistor of said second conductivity type including a first electrode coupled for receiving said second supply voltage, a control electrode coupled to said terminal of said current source, and a second electrode, wherein said second transistor is operated in said reverse mode; and a resistor including a first terminal coupled to said second electrode of said second transistor and a second terminal coupled to said terminal of said sense load circuit.

23. A method for charging a battery comprising:

pulsing a first predetermined current when a voltage of the battery is below a first predetermined voltage;

pulsing a second predetermined current when said voltage of the battery is above said first predetermined voltage;

sensing said voltage of the battery between current pulses of said first or second predetermined currents; and stopping said pulsing of said second predetermined current when said battery voltage is above a second predetermined voltage.

* * * * *